United States Patent [19]

Barbarits et al.

[11] Patent Number: 4,949,862
[45] Date of Patent: Aug. 21, 1990

[54] PRESSURE RELIEF DEVICE, AND METHOD

[75] Inventors: Joseph K. Barbarits, Cheektowaga; Leonard T. Kujawa, West Seneca, both of N.Y.

[73] Assignee: Carleton Technologies, Inc., East Aurora, N.Y.

[21] Appl. No.: 438,505
[22] PCT Filed: May 16, 1989
[86] PCT No.: PCT/US89/02100
 § 371 Date: Nov. 8, 1989
 § 102(e) Date: Nov. 8, 1989
[87] PCT Pub. No.: WO89/09902
 PCT Pub. Date: Oct. 19, 1989
[51] Int. Cl.$^5$ .............................................. B65D 90/34
[52] U.S. Cl. .................................. 220/89.1; 220/207
[58] Field of Search ................. 220/89 A, 89 B, 89 R, 220/207; 137/63.1, 73, 74

[56] References Cited

U.S. PATENT DOCUMENTS 3,897,799  8/1975  Lee .
4,413,746 11/1983  Matsutani .
4,416,388 11/1983  Mulaneski .
4,744,382  5/1988  Visnic et al. .

Primary Examiner—Joseph Man-Fu Moy
Attorney, Agent, or Firm—Sommer, Oliverio & Sommer

[57] ABSTRACT

An improved pressure relief device (40) for a pressure vessel (42) includes a thin-walled cylindrical tube (41) mounted on the pressure vessel such that the interiors of the vessel and tube continuoulsy communicate with one another. A flat (50) is ground, or otherwise machined, on the tube outer surface to form a weakened wall portion (54) of reduced wall thickness. The vessel is first filled with pressurized fluid through the tube. Thereafter, the remote marginal end portion of the tube is crimped together, and the remote end (44) thereof brazed (53) to hermetically seal the same. The weakened portion is so dimensioned and configured that, should the pressure differential across the tube wall exceed the burst pressure of the tube, the tube will rupture predictably along a longitudinally-extending line (55) in the outer surface of the weakened portion.

18 Claims, 2 Drawing Sheets

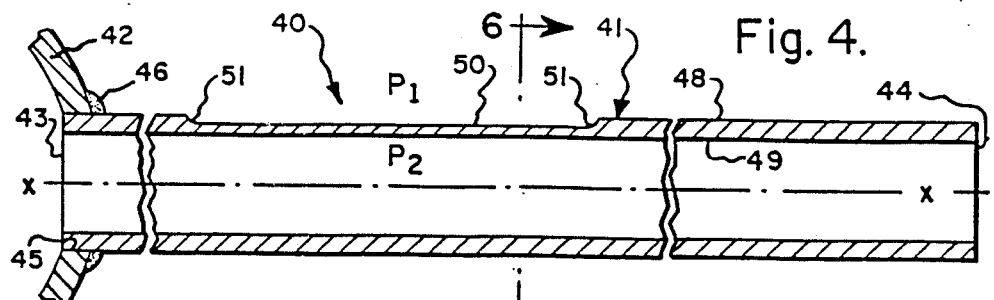
Fig. 4.
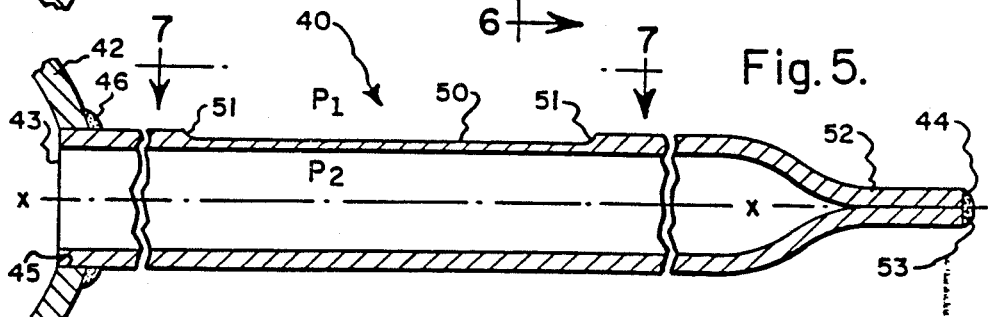
Fig. 5.
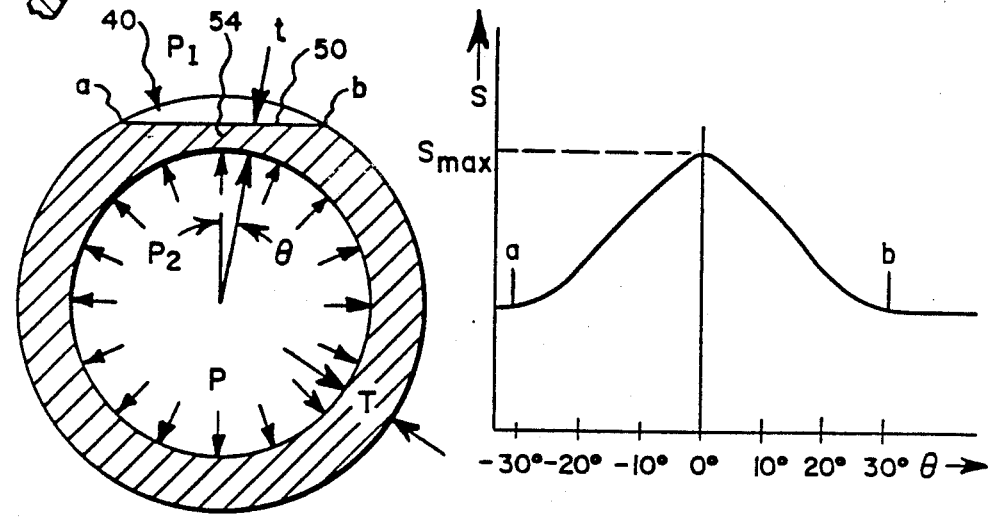
Fig. 6.
Fig. 8.
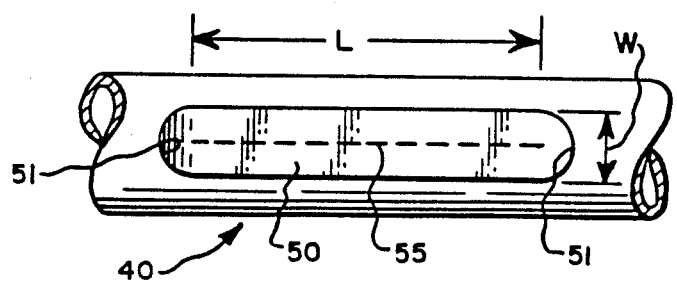
Fig. 7.

PRESSURE RELIEF DEVICE, AND METHOD

TECHNICAL FIELD

This invention relates generally to the field of burst-type pressure relief devices for pressure vessels, and, more particularly, to an improved pressure relief device which will rupture at a predetermined location whenever the pressure within the vessel exceeds the burst pressure of the device.

BACKGROUND ART

Pressure vessels abound in modern usage for a myriad of different and diverse applications. Because of the possibility that upon a rupture, an overly-pressurized vessel may hurl metal fragments in many directions, much like shrapnel from a grenade, it is common to provide such vessels with pressure relief devices. In some applications, these pressure relif devices may be in the form of a mechanically-operable valve having a valve member biased to engage a seat. However, if the vessel is intended to store highly-pressurized fluid for a long period of time, the possibility of leakage past mechanical seals reduces the useable shelf or storage life of the vessel.

To overcome this deficiency, it has been known to provide such pressure vessels, particularly those which are designed for long-term storage, with diaphragm-type burst disks. These disks form an integral part of the enclosing wall, and, being hermetically sealed, effectively solve the problem of leakage past relatively-movable parts (e.g., between a valve member and its seat). In effect, such burst disks are a type of fuse which is deliberately designed to rupture in the event of an over-pressure condition within the vessel. However, such burst disks, while generally effective for their intended purpose, are believed to be unduly complicated to machine and manufacture, and are difficult to install. Moreover, the material of which the disk is made (e.g., stainless steel) will work-harden when the vessel is initially pressurized. Because of dimensional tolerances of the various components of such prior art burst disk assemblies, the expected burst pressure of a particular vessel would occur in a widened range.

DISCLOSURE OF THE INVENTION

The present invention broadly provides an improved burst-type pressure relief device which is adapted to be use in association with a pressure vessel.

In one aspect, the improved device broadly comprises: an elongated tube having an inner surface and having an outer surface; a first fluid pressure acting on the tube outer surface; a second fluid pressure acting on the tube inner surface; the second pressure being greater than the first pressure so that a pressure differential will normally exist between the tube inner and outer surfaces, the tube having a weakened portion of reduced wall thickness, this weakened portion being so dimensioned and configured that the maximum hoop stress in the tube will occur along a line on the outer surface of the weakened portion; whereby, should the pressure differential between the inner and outer tube surfaces exceed the burst pressure of the tube, the tube will rupture predictably along the line.

In another aspect, the invention provides an improved method of filling a pressure vessel with pressurized fluid from a source and providing the vessel with an over-pressure relief device, which method comprises the steps of: providing an elongated tube with a weakened portion of reduced wall thickness, this weakened portion being so dimensioned and proportioned that the maximum hoop stress attributable to a fluid pressure within the tube will normally occur along a line on the outer surface of the weakened portion; mounting the tube on the vessel such that the interior of the vessel will communicate with the interior of the tube; connecting the other end of the tube to the fluid source; pressurizing or charging the vessel through the tube with fluid from the source; crimping, or otherwise deforming, the tube other marginal end portion to sealingly close the same; and disconnecting such crimped other end portion from the source; thereby to fill the vessel with pressurized fluid and to form a pressure relief device for the vessel such that, should the pressure within the vessel and tube exceed the burst pressure of the tube, the tube will rupture predictably along the line in the weakened portion.

In yet another aspect, the invention provides an improved pressure relief device for a pressure vessel, which device is formed by the steps of: providing an elongated tube with a weakened portion of reduced wall thickness, the weakened portion being so dimensioned, proportioned and arranged that the maximum hoop stress in the weakened portion attributable to a positive fluid pressure differential within the tube will normally occur along a line on the outer surface of the weakened portion; mounting one end of the tube on a pressure vessel such that the interior of the vessel will continuously communicate with the interior of the tube; and crimping the other marginal end portion of the tube to sealingly close the same; thereby to form a pressure relief device which continuously communicates with the interior of the tube such that, should the pressure within the vessel and tube exceed the burst pressure of the tube weakened portion, the tube will rupture predictably along the predetermined line. If desired, the crimped end of the tube may be hermetically sealed, as by brazing, welding or the like.

Accordingly, the general object of this invention is to provide an improved pressure relief device for a pressure vessel.

Another object is to provide an improved method of, first, filling a pressure vessel with pressurized fluid from a source, and, thereafter, providing the pressure vessel with an over-pressure relief device.

Another object is to provide an improved pressure relief device for a pressure vessel, which device is formed uniquely by a novel method.

Still another object is to provide an pressure relief device which is particularly suitable for use with a pressure vessel which is designed for long-term storage, which is thought to have a burst pressure falling within a reduced tolerance band, and which will rupture at a predictable location and at a predictable over-pressure condition in a manner less dependent on the geometry of a particular assembly.

These and other objects and advantages will become apparent from the foregoing and ongoing written specification, the drawings, and the appended claims.

BRIEF DESCRIPTION OF THE DRAWINGS

FIG. 4 is a fragmentary vertical sectional view of an improved tube operatively attached to a pressure vessel.

FIG. 5 is a view, similar to FIG. 4, but showing the right marginal end portion of the tube as having been crimped together and hermetically sealed.

FIG. 6 is a fragmentary transverse vertical sectional view of the tube, this view being taken generally on line 6—6 of FIG. 4, showing the weakened wall portion of reduced radial thickness in transverse cross-section, and also showing a positive pressure differential as being distributed about the inner surface of the tube.

FIG. 7 is a top plan view of the weakened portion of the tube, taken generally on line 7—7 of FIG. 5, and showing the ground flat thereon.

FIG. 8 is a plot of hoop stress (S) vs. angular position ($\theta$) of the weakened portion of the pressurized tube wall.

MODE(S) OF CARRYING OUT THE INVENTION

Figure 1:
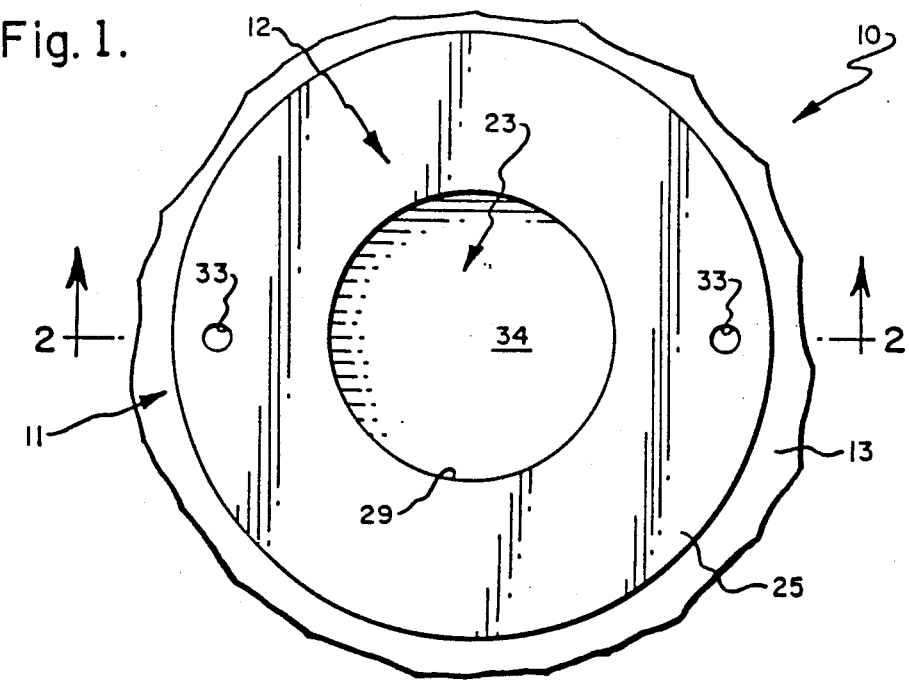
FIG. 1 is a top plan view of a prior art burst disk, shown as being operatively mounted on a fragmentary portion of a body.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., arrangement of parts, mounting, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to its axis of elongation, or axis of rotation, as appropriate.

Pressure vessels are designed to safely house and store the serviced fluid at, or less than, a predetermined maximum pressure. The stresses in the enclosing wall of such a vessel may be readily calculated as a function of the pressure differential ($\Delta P$) across the wall, the size, shape and configuration of the vessel, the wall thickness of the vessel, possibly inter alia. The vessel is designed such that the maximum stress created in the wall and attributable to the stored fluid pressure, is well below the yield point of the material of which the wall is formed. Indeed, it is common to design such vessels such that the anticipated stress is a fraction of the maximum stress which the tank is capable of withstanding, in order to provide an accompanying factor of safety.

When used to store highly-pressurized gas, such vessels are, in effect, potential grenades. For example, should the vessel be subject to a rapid rise in temperature, as by being in a fire, the pressure of gas therewithin may quickly increase to a level which exceeds the burst or rupture stress of the vessel. Because of this possibility, it is common to provide such pressure vessels with suitable pressure relief devices to relieve an over-pressure condition, whatever its cause.

In some cases, the relief device may be in the form of a mechanical valve member which is spring-biased to move toward a seat to normally close an opening. Hence, should the pressure within the vessel increase above design limits, the valve member is designed to be displaced off its seat, thereby allowing the excess fluid pressure to be released. These valve-type devices are in common use, and are generally acceptable when leakage between the valve member and the seat does not pose a substantial problem.

In other cases, however, the vessel is designed for long-term storage. In such cases, the vessel must be capable of holding the pressurized fluid for a long period of time. Hence, leakage between the mechanical valve member and its seat does pose a substantial problem. Indeed, if the vessel is designed to have a useful shelf life of, say, ten years, then such leakage between the valve member and its seat, however slow, will be unacceptable. To accommodate this, such vessels have been hermetically sealed, and a burst-type pressure relief device has been substituted for the mechanical valve-and-seat arrangement described above.

Figure 3:
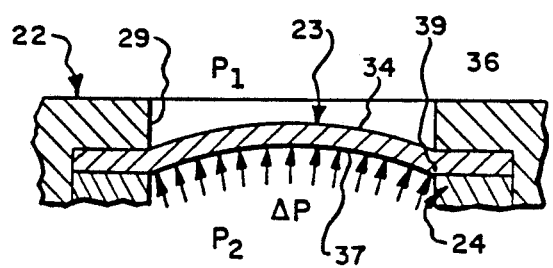
FIG. 3 is a schematic fragmentary detail view of the prior art burst disk showing a positive pressure differential beneath the disk as acting across its lower face, and bowing the same upwardly, the extent of such bowing being exaggerated for purposes of illustration.

The present invention broadly provides, in one aspect, an improved pressure relief device for use in association with a pressure vessel (e.g., a bottle, cylinder, canister, or the like). In another aspect, the invention provides an improved method of, first, filling a vessel with pressurized fluid, and, thereafter, providing such filled vessel with a pressure relief device. In still another aspect, the invention provides an improved pressure relief device which is formed by a particular method. However, before proceeding to a description and discussion of the improved method and apparatus, it is deemed advisable to first review the structure and operation of a conventional prior art burst disk-type pressure relief device. Such prior art device is illustrated in FIGS. 1-3, and the improved apparatus is illustrated in FIGS. 4-8.

PRIOR ART BURST DISK (FIGS. 1-3)

Figure 2:
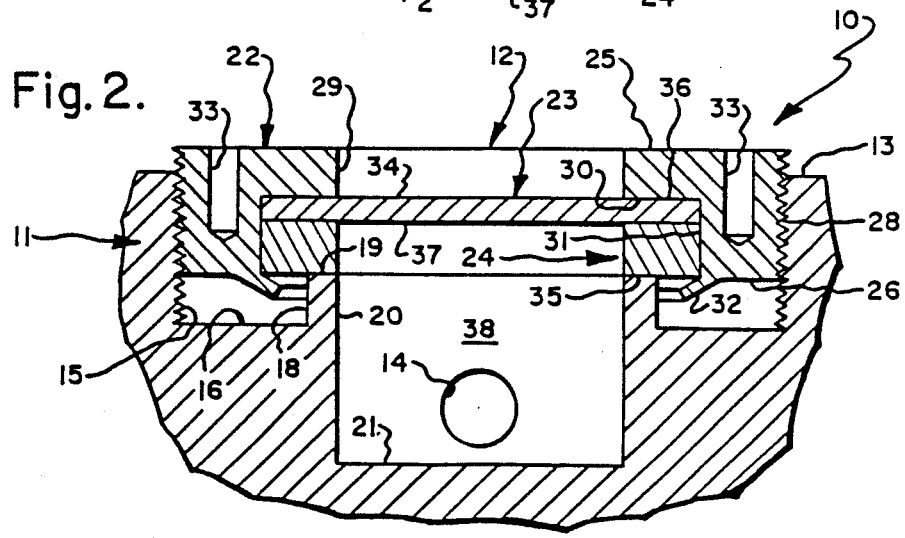
FIG. 2 is a fragmentary vertical sectional view thereof, taken generally on line 2—2 of FIG. 1, and showing the burst disk assembly as being threadedly mounted on the body.

Referring now to FIGS. 1-2, a conventional (i.e., prior art) burst-type pressure relief valve, generally indicated at 10, is shown as broadly including a body 11, and a removable burst-disk assembly, generally indicated at 12, mounted thereon.

The body may be a portion of the vessel enclosing wall, or may be some intermediate structure mounted on the vessel. In FIG. 2, a fragmentary portion of body 11 is shown as having an upwardly-facing planar horizontal surface 13. A stepped recess extends downwardly into the body to intersect a horizontal inlet 14 which communicates with the interior of a pressure vessel (not shown). This body recess is shown as being sequentially bounded by an internally-threaded vertical portion 15 extending downwardly from body upper surface 13, an upwardly-facing annular horizontal surface 16, an outwardly-facing vertical cylindrical surface 18, an upwardly-facing annular horizontal seat surface 19, and an inwardly-facing vertical cylindrical surface 20 continuing downwardly therefrom to join an upwardly-facing circular horizontal recess bottom surface 21. Thus, recess surfaces 15,16,18 define therebetween an upwardly-facing annular groove, having a U-shaped transverse cross-section, about raised seat surface 19, with a deeper recess extending downwardly into the body from within this seat surface. This deeper recess is defined by body surfaces 20,21.

The burst-disk assembly 12 includes an uppermost specially-machined fitting 22, an intermediate diaphragm-type burst disk 23, and a lowermost compression ring 24, these three elements being normally retained together so that they may be removed from the body as a sub-assembly. Fitting 22 has an annular horizontal upper surface 25, an annular horizontal lower surface 26, and an externally-threaded outer portion 28 extending therebetween. Threaded portion 28 is shown as being in mating engagement with body threaded portion 15. The inner surface of fitting 22 sequentially includes an inwardly-facing vertical cylindrical surface 29 extending downwardly from upper surface 25, a downwardly-facing annular horizontal shoulder surface 30, and an inwardly-facing vertical cylindrical surface 31 continuing downwardly therefrom to join lower surface 26. An integral annular flange portion 32 extends downwardly from the fitting proximate the intersection of surfaces 31,26 for a purpose hereinafter explained. Diametrically-opposite blind vertical holes, severally indicated at 33, are shown as extending downwardly into the fitting from its upper surface 25 to receive and accommodate the mating prongs of a suitable turning tool (not shown), by which the fitting may be selectively rotated relative to the body.

The burst disk 23 is shown as being a circular disk-like element having the outer peripheral margin of its upper surface 34 arranged to engage downwardly-facing fitting surface 30.

Compression ring 24 is shown as being an annular ring-like element having the inner margin of its annular horizontal lower face 35 arranged to engage fitting seat surface 19. The upper surface 36 of member 24 is arranged to engage the outer peripheral margin of the lower surface 37 of the burst disk. After the burst disk and compression ring have been operatively positioned within the fitting, flange portion 32 is struck or bent inwardly to hold the fitting, burst disk and compression ring together as a subassembly. Hence, the entire burst disk assembly may be selectively mounted on, or removed from, the body as a unit. Flange portion 32 merely holds the three components of the burst disk assembly (i.e., the fitting, the burst disk and the compression ring) together, but does not affect the integrity of the seal formed when the fitting is rotatively tightened into sealed engagement with the body. In the prior art, the fitting, burst disk and body were formed of stainless steel. The compression ring, however, was typically formed of a relatively-soft metal, such as brass or the like. Hence, when the burst disk assembly was threaded tightly into engagement with the body, the soft metal of the compression ring would compressively deform into fluid-tight conformal sealing engagement with the lower surface of the burst disk and with fitting seat surface 19, to provide a fluid-tight metal-to-metal seal. Thus, the periphery of burst disk 23 was compressively sandwiched between the fitting and the compression ring, while the central portion of the disk functioned much as a diaphragm-like member. The differential pressure within the vessel was supplied via inlet 14 to the chamber 38 formed between the burst disk and the fitting, and acted on the entire circular area (A) of the unrestrained central portion of the disk. Depending upon the magnitude of this pressure differential, the diaphragm portion of the disk would bow outwardly, as schematically illustrated in FIG. 3. The absolute pressure of a first fluid acting on the upper surface of disk 23 is indicated as being $P_1$, while the absolute pressure of a second fluid within the vessel and acting on the underside of the disk is indicated as being $P_2$. Hence the differential pressure acting across the disk is the difference therebetween (i.e., $\Delta P = P_2 - P_1$). The disk upper surface was commonly exposed to atmospheric pressure. On the other hand, the pressure within the vessel might typically be on the order of 3,000–10,000 pounds per square inch (psi) [204.14–680.46 bar]. Hence, in such case, the magnitude of pressure $P_1$ paled into relative insignificance. In other words, the pressure differential across the disk was substantially equal to the pressure $P_2$ within the vessel for all practical intents and purposes.

A number of observations can be made about this prior art burst disk. First, when the burst disk assembly was rotated into engagement with the body, the entire burst disk sub-assembly would initially rotate together as a unit relative to the body. As such rotation continued, the lower surface 35 of compression ring 24 would move axially downwardly to engage body seat surface 19. As rotation of the fitting continued, the normal force between the compression ring and the seat would increase. Hence, the frictional forces (i.e., $F = \mu N$) between the engaged, but relatively-rotating, compression ring and body seat surfaces, would also increase. These frictional forces tended to brake the compression ring against further rotation relative to seat surface 19. However, as rotation of fitting 22 continued, rotational slippage would occur between the compression ring and the disk, or between the disk and the fitting, or both. Hence, the outermost annular portion of the burst disk (i.e., that portion between the compression ring 24 and fitting surface 30) was actually subjected to shear stress. The magnitude of such stress was a function, inter alia, of how tightly the fitting was threaded into engagement with the body.

The differential fluid pressure (i.e., $\Delta P = P_2 - P_1$) acted across the exposed circular area (A) of the burst disk to exert a net force (i.e., $F = \Delta P A$) which urged the central portion of the disk to bow outwardly, as schematically shown in FIG. 3. When initially pressurized, the central portion of the disk would bow and would work-harden. Such bowing would cause an annular stress concentration, indicated at 39, between the central bowed portion of the disk and the outermost annular restrained portion.

The point of the foregoing is to demonstrate that the burst disk was subjected to various stresses, the magnitudes of which would actually vary individually on a disk-by-disk basis. For example, the magnitude of the shear stress would be a function of the torque applied to rotate the fitting into fluid-tight sealed engagement with the body. Moreover, the coefficient of friction between relatively-moving parts could vary depending upon the extent to which the disk assembly was manually handled prior to assembly. The differential pressure acting on the disk could also vary. Dimensional tolerances of the various manufactured parts would also contribute to performance variations between disks. These various factors, possibly inter alia, introduced an unpredictability factor into the intended performance of the disks (i.e., whether they would actually rupture at the designed pressure differential). In addition to this, the prior art burst disk assembly required machined parts that were relatively expensive to manufacture.

THE IMPROVED DISK (FIGS. 4-8)

Referring now to FIGS. 4-8, the presently-preferred form of the improved pressure relief device, generally indicated at 40 in FIGS. 5-7, is provided by modifying the fill tube through which the vessel is initially charged with pressurized fluid.

FIG. 4 depicts a thin-walled cylindrical fill tube, generally indicated at 41, as being operatively mounted on a fragmentary portion of a pressure vessel, generally indicated at 42. Tube 41 is shown as being elongated along horizontal axis x—x, and as having annular vertical left and right end faces 43,44, respectively. The left marginal end portion of the tube is shown as being received within a suitable opening 45 provided in the vessel. The tube is hermetically sealed to the vessel by means of an annular braze or weldment, indicated at 46. The particular length of the tube is not deemed to be critical, and, for that reason, the length of the tube is shown as being broken in FIGS. 4 and 5.

As best shown in FIGS. 4-6, tube 41 has a cylindrical outer surface 48 exposed to the pressure (i.e., $P_1$) of a first fluid (e.g., the ambient atmosphere), and has a cylindrical inner surface 49 exposed to the pressure (i.e., $P_2$) of a second fluid (i.e., helium, nitrogen, or the like, although not necessarily a gas) within the vessel. Hence, as used herein, the term "fluid" is intended in a generic sense, and specifically includes both liquids and gases. The normal radial thickness of tube 41 between surfaces 48,49 is indicated by dimension T. As previously noted, tube 41 provides a means by which the vessel may be charged with second fluid from a suitable source thereof (not shown) to the desired pressure.

In the presently-preferred embodiment, the improved pressure relief device is provided by simply grinding, or otherwise machining, a suitable planar flat 50 in a portion of the tube prior to its mounting on the vessel. In FIG. 7, flat 50 is shown as having an axial length L and a transverse width W, and as being arranged in a horizontal plane. The axial end portions 51,51 of the flat are shown as being in generally-smooth continuous arcuate transition from the planar surface of flat 50 to the cylindrical outer surface 48 of the tube. The particular length L of the flat is not deemed to be critical. After the flat has been initially formed, the tube may be suitably annealed, or otherwise heat-treated, if desired, to alter or condition material properties and/or to relieve stress concentrations created in the tube by the flat-forming process.

After the tube has been initially mounted on the vessel, as shown in FIG. 4, the vessel is charged through the tube with second fluid to the desired pressure. The remote marginal end portion of the tube is then crimped, or otherwise deformed, as indicated at 52 in FIG. 5, to close end 44 thereof. The tube may then be disconnected from the source. Thereafter, the crimped tube end portion may be hermetically sealed, as by a suitable braze or weldment indicated at 53.

The effect of flat 50 is to provide the tube with an integrally-formed weakened portion 54 of reduced wall thickness in a radial direction, as clearly shown in FIG. 6. In the preferred embodiment, flat surface 50 occupies an arc distance of about 62°, with the minimum wall thickness being in the 12:00 o'clock position in a vertical plane which includes tube axis x—x. Dimension t represents the radial wall thickness of the tube weakened port 54 at an angle $\theta$ from this vertical plane. Thus, point a occurs at $\theta = -31°$ at the intersection of the left edge of flat surface 50 with the outer surface of the tube, while point b occurs at $\theta = +31°$ at the intersection of the right edge of flat surface 50 with the tube outer surface. Hence, at $\theta = -31°$, the radial wall thickness is at its maximum (i.e., $t = t_{max} = T$); at $\theta = 0°$, the wall thickness is at its minimum (i.e., $t = t_{min}$); and at $\theta = +31°$, the wall thickness is again at its maximum (i.e., $t = t_{max} = T$). Since the hoop stress is inversely related to the wall thickness, the maximum hoop stress ($S_{max}$) will occur along a radial plane in which the wall thickness is a minimum (i.e., $\theta = 0°$). This radial plane of maximum stress will intersect flat surface 50 to form a longitudinally-extending line, indicated at 55 in FIG. 7. Hence, the maximum stress will occur in a line 55 on the outer surface of the weakened portion. The advantage of this is that the improved burst disk is less sensitive to aggregated dimensional tolerances of various component parts.

FIG. 8 is a plot depicting the hoop stress S (ordinate) in the weakened portion versus the angle $\theta$ (abscissa), and demonstrates that the hoop stress in the side wall will reach its maximum value ($S_{max}$) at $\theta = 0°$. The hoop stress will fall off as $\theta$ approaches $\pm 31°$, and will remain constant throughout the remainder of the side wall (assuming, or course, that the tube material is homogeneous and that wall thickness T remains substantially constant.

Thus, the invention provides an improved method of filling a pressure vessel with fluid and/or providing such vessel with an improved burst-type pressure relief device. Unlike the prior art embodiment, there are no significant shear stresses attributable to the mounting of the burst disk assembly on the body. Such stresses as are created by the formation of flat 50 may be selectively relieved, if desired, by heat-treating or the like, prior to mounting the tube on the vessel. Moreover, the maximum hoop stress will occur in the radial plane of minimum thickness, and the disk will rupture at a predictable location (i.e., along the line in flat 49 of maximum stress) and at a more-predictable pressure differential. In addition to this, the improved device involves fewer parts, is therefore less expensive to manufacture, and is insensitive to variations in the coefficient of friction.

MODIFICATIONS

The present invention contemplates that many changes and modifications may be made.

For example, while the tube in the preferred embodiment is shown as being in the form of a thin-walled cylinder, it is manifest that elongated tubes having other transverse cross-sectional shapes and configurations (e.g., polygonal, etc.) may be readily substituted therefor. Whatever its shape, the weakened portion of the tube wall need not necessarily be provided by grinding or otherwise machining a planar flat therein. Indeed, the outer surface of the weakened portion may be either planar or arcuate, as desired. If a chordal flat is provided, as shown, the length and width of such flat may be readily varied. In the tube has a square or rectangular cross-section, for example, the weakened portion may be formed by appropriately beveling an outside corner thereof to provide the weakened portion. While the improved device is particularly suited for use with stainless steels, the material of which the tube is formed is not deemed critical.

Therefore, while the presently-preferred form of the improved pressure relief device has been shown and described, and certain possible modifications thereof discussed, persons skilled in this art will readily appreciate that various additional changes and modifications may be made without departing from the spirit of the invention, as defined and differentiated by the following claims.

We claim:

1. A pressure relief device, comprising:
    an elongated tube having an inner surface and having an outer surface;
    a first fluid pressure acting on said tube outer surface;
    a second fluid pressure acting on said tube inner surface;
    said second pressure being greater than said first pressure so that a pressure differential will normally exist between said inner and outer surfaces;
    said tube having a weakened portion of reduced wall thickness, said portion being so dimensioned and configured that the maximum hoop stress in said tube will occur along a line in the outer surface of said weakened portion;
    whereby, should said pressure differential exceed the burst pressure of said tube, said tube will rupture predictably along said line.

2. A pressure relief device as set forth in claim 1 wherein said tube is configured as a thin-walled cylinder.

3. A pressure relief device as set forth in claim 1 wherein said tube inner surface is cylindrical.

4. A pressure relief device as set forth in claim 1 wherein said tube outer surface is cylindrical.

5. A pressure relief device as set forth in claim 1 wherein said tube outer surface about said weakened portion is dissimilar in shape to the longitudinally adjacent portions of said tube outer surface.

6. A pressure relief device as set forth in claim 5 wherein said tube outer surface about said weakened portion is substantially planar.

7. A pressure relief device as set forth in claim 5 wherein said tube outer surface is in generally smooth continuous transition between said weakened portion and said adjacent longitudinal portions.

8. A pressure relief device as set forth in claim 1 wherein said line is substantially parallel to the longitudinal axis of said tube.

9. A pressure relief device as set forth in claim 1, and further comprising:
    a pressure vessel containing said second fluid, and wherein the interior of said tube communicates through one end thereof with the interior of said pressure vessel.

10. A pressure relief device as set forth in claim 9 wherein the other marginal end portion of said tube is crimped together to close such other tube end.

11. A pressure relief device as set forth in claim 10 wherein said crimped other tube end is hermetically sealed.

12. A pressure relief device as set forth in claim 11 wherein said tube other end is brazed to hermetically seal said other tube end.

13. The method of filling a pressure vessel with pressurized fluid from a source and providing said vessel with an over-pressure relief device, comprising the steps of:
    providing an elongated tube with a weakened portion of reduced wall thickness, said portion being so dimensioned and configured that the maximum hoop stress attributable to a fluid pressure within said tube will normally occur along a line in the outer surface of said weakened portion;
    mounting said tube on said vessel such that the interior of said vessel will communicate with the interior of said tube;
    connecting the other end of said tube to said fluid source;
    pressurizing said vessel from said source through said tube;
    crimping said tube other marginal end portion to close the same; and
    disconnecting said tube other end from said source;
    thereby to fill said vessel with pressurized fluid and to form a pressure relief device such that, should the pressure in said vessel and tube exceed the burst pressure of said tube weakened portion, said tube will rupture predictably along said line.

14. The method as set forth in claim 13 and further comprising the additional step of:
    hermetically sealing such crimped other marginal end portion of said tube.

15. The method as set forth in claim 13 and further comprising the additional step of:
    brazing said tube other end to hermetically seal the same.

16. A pressure relief device for a pressure vessel, formed by the steps of:
    providing an elongated tube with a weakened portion of reduced wall thickness, said portion being so dimensioned and proportioned that the maximum hoop stress attributable to a fluid pressure within said tube will normally occur in a line in the outer surface of said weakened portion;
    mounting one end of said tube on said vessel such that the interior of said vessel will continuously communicate with the interior of said tube; and
    crimping the other marginal end portion of said tube to close the same;
    thereby to form a pressure relief device associated with said vessel such that, should the pressure within said vessel exceed the burst pressure of said tube, said tube will rupture predictably along said line.

17. A pressure relief device as set forth in claim 16, which is formed by the further step of:
    brazing said crimped other end of said tube to hermetically seal the same.

18. A pressure relief device as set forth in claim 15, and further comprising the additional step of:
    hermetically sealing the crimped other end of said tube.

* * * * *